United States Patent
Fujimoto et al.

(10) Patent No.: US 10,264,617 B2
(45) Date of Patent: Apr. 16, 2019

(54) WIRELESS RELAY DEVICE, CONTROL DEVICE, WIRELESS COMMUNICATION SYSTEM, AND JOINING METHOD

(71) Applicant: YOKOGAWA ELECTRIC CORPORATION, Musashino-shi, Tokyo (JP)

(72) Inventors: Naoyuki Fujimoto, Tokyo (JP); Masato Yamaji, Tokyo (JP); Kenichi Takeda, Tokyo (JP); Haruka Yamada, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 79 days.

(21) Appl. No.: 15/246,688

(22) Filed: Aug. 25, 2016

(65) Prior Publication Data
US 2017/0064763 A1 Mar. 2, 2017

(30) Foreign Application Priority Data

Aug. 27, 2015 (JP) ................ 2015-168223

(51) Int. Cl.
| | | |
|---|---|---|
| *H04W 76/16* | (2018.01) | |
| *H04W 76/18* | (2018.01) | |
| *G05B 19/418* | (2006.01) | |
| *H04W 12/04* | (2009.01) | |
| *H04B 7/155* | (2006.01) | |
| *H04W 48/10* | (2009.01) | |
| *H04W 48/18* | (2009.01) | |
| *H04W 4/00* | (2018.01) | |
| *H04W 4/70* | (2018.01) | |
| *H04L 29/08* | (2006.01) | |
| *H04W 84/04* | (2009.01) | |

(52) U.S. Cl.
CPC ........ *H04W 76/16* (2018.02); *G05B 19/4185* (2013.01); *H04B 7/15507* (2013.01); *H04W 4/00* (2013.01); *H04W 12/04* (2013.01); *H04W 48/10* (2013.01); *H04W 48/18* (2013.01); *H04W 76/18* (2018.02); *G05B 2219/31093* (2013.01); *H04L 67/12* (2013.01); *H04W 4/70* (2018.02); *H04W 84/047* (2013.01)

(58) Field of Classification Search
None
See application file for complete search history.

(56) References Cited

U.S. PATENT DOCUMENTS

| | | | |
|---|---|---|---|
| 9,854,456 B2 * | 12/2017 | Vardhan | ............... H04W 24/02 |
| 2002/0045423 A1 | 4/2002 | Sashihara et al. | |
| 2002/0131602 A1 | 9/2002 | Ishii | |

(Continued)

FOREIGN PATENT DOCUMENTS

| | | |
|---|---|---|
| EP | 2381648 A2 | 10/2011 |
| JP | 2002124955 A | 4/2002 |

(Continued)

*Primary Examiner* — Andrew C Oh
(74) *Attorney, Agent, or Firm* — Sughrue Mion, PLLC

(57) ABSTRACT

A wireless relay device that performs relay of data over a wireless network includes: a manager that manages a second wireless network different from a first wireless network that the own device joins; and a transfer controller that transfers data transmitted to the own device over the second wireless network, to a preset transfer destination over the first wireless network.

13 Claims, 9 Drawing Sheets

(56) References Cited

U.S. PATENT DOCUMENTS

| | | | |
|---|---|---|---|
| 2006/0133414 A1* | 6/2006 | Luoma | H04W 88/16 370/466 |
| 2007/0297609 A1* | 12/2007 | Adams | H04L 63/0853 380/270 |
| 2009/0054033 A1* | 2/2009 | Pratt, Jr. | G01D 21/00 455/410 |
| 2009/0310692 A1* | 12/2009 | Kafle | H04L 5/0007 375/260 |
| 2010/0290351 A1* | 11/2010 | Toepke | G05B 19/4185 370/250 |
| 2011/0110291 A1 | 5/2011 | Ishii | |
| 2011/0187490 A1* | 8/2011 | Nakamoto | G05B 19/418 340/3.9 |
| 2011/0213900 A1* | 9/2011 | Nakamoto | G05B 19/0423 710/8 |
| 2011/0228720 A1 | 9/2011 | Ninagawa et al. | |
| 2011/0228725 A1* | 9/2011 | Nakamoto | G08C 17/00 370/328 |
| 2011/0261757 A1* | 10/2011 | Nakamoto | H04L 41/0806 370/328 |
| 2012/0036568 A1* | 2/2012 | Kodama | G05B 19/0423 726/7 |
| 2012/0108917 A1* | 5/2012 | Libbus | A61B 5/0006 600/301 |
| 2013/0227290 A1 | 8/2013 | Yoneyama et al. | |
| 2013/0254519 A1* | 9/2013 | Benoit | H04W 12/04 713/1 |
| 2013/0267164 A1* | 10/2013 | Kodama | H04W 4/21 455/7 |
| 2014/0010111 A1* | 1/2014 | Kodama | H04L 41/0806 370/254 |
| 2014/0177518 A1 | 6/2014 | Akisada et al. | |
| 2014/0201529 A1* | 7/2014 | Ma | H04L 63/20 713/168 |
| 2014/0204833 A1* | 7/2014 | Negishi | H04W 12/06 370/315 |
| 2014/0341105 A1* | 11/2014 | Vardhan | H04W 24/02 370/315 |
| 2014/0351591 A1* | 11/2014 | Kodama | H04L 9/0825 713/168 |
| 2015/0236903 A1* | 8/2015 | Kodama | H04W 76/10 370/254 |
| 2015/0282054 A1 | 10/2015 | Fujimoto et al. | |
| 2015/0351084 A1* | 12/2015 | Werb | H04W 4/70 370/329 |
| 2016/0057622 A1 | 2/2016 | Koshimizu | |
| 2016/0143028 A1* | 5/2016 | Mancuso | H04L 63/20 370/338 |
| 2016/0323030 A1* | 11/2016 | Fujimoto | H04B 7/15507 |
| 2016/0366175 A1* | 12/2016 | Basu Mallick | H04L 63/06 |
| 2017/0331860 A1* | 11/2017 | Ofversten | H04L 63/306 |

FOREIGN PATENT DOCUMENTS

| | | |
|---|---|---|
| JP | 2002281010 A | 9/2002 |
| JP | 2005-142848 A | 6/2005 |
| JP | 2006020153 A | 1/2006 |
| JP | 2010-81031 A | 4/2010 |
| JP | 2014-086852 A | 5/2014 |
| JP | 2014-192747 A | 10/2014 |
| JP | 2015046774 A | 3/2015 |

* cited by examiner

| | IDENTIFICATION INFORMATION | JOIN KEY | UPDATE PERIOD | DEVICE INFORMATION | NUMBER OF SENSORS |
|---|---|---|---|---|---|
| E1 | AA | KEY-A | 1 SECOND | TEMPERATURE SENSOR | 1 |
| E2 | BB | KEY-B | 3 SECONDS | PRESSURE SENSOR | 2 |
| E3 | CC | KEY-C | 5 SECONDS | MULTIPOINT TEMPERATURE SENSOR | 8 |
| E4 | DD | KEY-D | 5 SECONDS | MULTIPOINT TEMPERATURE SENSOR | 8 |
| ⋮ | ⋮ | ⋮ | ⋮ | ⋮ | ⋮ |

WIRELESS RELAY DEVICE, CONTROL DEVICE, WIRELESS COMMUNICATION SYSTEM, AND JOINING METHOD

BACKGROUND OF THE INVENTION

Field of the Invention

The present invention relates to a wireless relay device, a control device, a wireless communication system, and a joining method.

Priority is claimed on Japanese Patent Application No. 2015-168223, filed on Aug. 27, 2015, the content of which is incorporated herein by reference.

Description of Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, a distributed control system (DCS) has been constructed in plants or factories, and a highly automated operation has been realized. This distributed control system is a system in which a field device (a measurement device or an operating device) and a control device that performs control of the field device are connected via communication means. Some communication systems that are a basis of such a distributed control system perform wired communication. In recent years, a wireless communication system that performs wireless communication conforming to industrial wireless communication standards such as ISA100.11a or WirelessHART (registered trademark) has been realized.

In such a wireless communication system, a wireless network is centrally managed by one management device, mainly, from the viewpoint of prevention of compromises in security. For example, in a wireless communication system conforming to ISA100.11a described above, a joining process of causing field devices (wireless field devices) capable of wireless communication to join a wireless network, an encryption key distribution process, a process of allocating communication resources (time slots and communication channels), and other processes are performed by the management device called a system manager.

Japanese Unexamined Patent Application, First Publication No. 2014-86852 discloses an example of a wireless communication system conforming to, for example, ISA100.11a or WirelessHART (registered trademark) described above. Specifically, Japanese Unexamined Patent Application, First Publication No. 2014-86852 discloses an invention in which more wireless devices than those in a case of the related art can be caused to join the wireless network through withdrawal from a wireless network in a case in which a wireless device transmitting a request for joining the wireless network is caused to join the wireless network and wireless communication over the wireless network is completed.

The number of field devices provided in a plant or the like may generally increase or decrease according to a scale of the plant or the like, and may exceed 10000 in a large-scale plant or the like. Therefore, in a large-scale plant or the like, a large-scale wireless network (for example, a wireless network to which more than 10000 wireless field devices are connected) may be considered to be likely to be constructed in the future.

However, at present, since a wireless network is centrally managed by one management device, there is a problem in that it is difficult to construct a large-scale wireless network for the following reasons.

(1) Limit of Processing Capability of the Management Device

The number of wireless field devices that can connect to the wireless network is limited by the processing capability of the management device. In order to construct a large-scale wireless network, it is necessary to achieve improvement of the processing capability of the management device (for example, to perform a change to hardware in which a higher performance central processing unit (CPU) is mounted and more memories are mounted). However, since the improvement in processing capability of the management device is limited, it is difficult to construct a large-scale wireless network.

(2) Lack of Wireless Bandwidth Resources

In a wireless communication system, it is necessary to ensure a wireless bandwidth necessary for transmission and reception of data that is used for the joining process that is performed in order to cause a new wireless field device to join the wireless network, in addition to a wireless bandwidth necessary for a wireless field device that has already joined the wireless network to perform data transmission and reception. If a large number of field devices are caused to join the wireless network, the wireless bandwidth necessary for transmission and reception of data that is used for the joining process increases. Since in the wireless communication system, a wireless bandwidth that can be allocated is limited, the maximum number of wireless field devices that can connect to the wireless network is reduced by a wireless bandwidth allocated for transmission and reception of data used in the joining process. Thus, it is difficult to construct a large-scale wireless network due to lack of wireless bandwidth resources.

(3) Increase in Power Consumption

Data used for the above-described joining process is often relayed by a relay device (wireless router) arranged on a communication path between the wireless field device and the management device. If a large number of field devices are caused to join the wireless network, the data used for a joining process increases, and accordingly, power consumption of the relay device increases. If the amount of data relay is limited so that the power consumption of the relay device is equal to or less than a constant value, the number of wireless field devices that can join the wireless network is limited. Thus, if an increase in power consumption of the relay device is suppressed, it is difficult to construct a large-scale wireless network.

(4) Increase in Time Required for Joining Process

Since the data of the joining process is often relayed by the relay device (wireless router) arranged on the communication path between the wireless field device and the management device as described above, it takes a certain amount of time to complete the joining process. If more than a million wireless field devices are caused to join the wireless network, it takes a long time (for example, a few days) to complete the joining process of all of the wireless field devices. If the time required for the joining process is limited to a realistic time, the number of wireless field devices that can join the wireless network is limited. Thus, if the time required for the joining process is limited, it is difficult to construct a large-scale wireless network.

SUMMARY OF THE INVENTION

The present invention provides a wireless relay device, a control device, a wireless communication system, and a joining method capable of constructing a large-scale wireless network.

In order to solve the above problems, a wireless relay device of the present invention is a wireless relay device (12) that performs relay of data over a wireless network (N1), the wireless relay device including: a manager (25) that manages a second wireless network (N21 or N22) different from a first wireless network (N11) that the own device joins; and a transfer controller (24) that transfers data transmitted to the own device over the second wireless network, to a preset transfer destination over the first wireless network.

Further, the wireless relay device of the present invention further includes a storage (28) that stores setting information (Q1) that is set in a wireless device (11) joining the second wireless network.

Further, in the wireless relay device of the present invention, the manager performs a joining process of causing a wireless device transmitting a request for joining the second wireless network to join the second wireless network using the setting information stored in the storage.

Further, in the wireless relay device of the present invention, the manager requests a controller (17) at an upper level to transmit the setting information in a case in which the setting information necessary for a joining process of the wireless device transmitting the joining request is not stored in the storage.

Further, in the wireless relay device of the present invention, in a case in which the manager fails in authentication of the wireless device transmitting the joining request, the manager requests the controller (17) at an upper level to transmit new setting information.

Further, in the wireless relay device of the present invention, the manager deletes the setting information of a wireless device in which no data is obtained in a predefined period, from the storage.

Further, in the wireless relay device of the present invention, the manager deletes the setting information of the wireless device from the storage in a case in which a first period (T1) defined so as to determine disconnection of wireless communication elapses and a second period (T2) defined in consideration of re-joining the second wireless network elapses after no data from the wireless device is obtained.

Further, in the wireless relay device of the present invention, the manager performs deletion of the setting information stored in the storage on the basis of a deletion request for the setting information received from the controller (17) at an upper level.

Further, in the wireless relay device of the present invention, the transfer controller performs data transmission and reception setting for the wireless device that joins the second wireless network on the basis of the setting information stored in the storage.

Further, in the wireless relay device of the present invention, the data transmitted to the own device over the second wireless network is encrypted, and the wireless relay device further includes an encryption processor (23) that performs decryption of the data which is transmitted to the own device and performs encryption of the data to be transferred to the transfer destination.

A control device of the present invention is a control device (17) that controls a device joining a wireless network (N1), in which setting information set in a wireless device (11) joining the second wireless network is provided to the wireless relay device (12) described above.

Further, in the control device, a deletion request for the setting information is performed to the wireless relay device.

Further, in the control device, in a case in which neighbor information indicating the wireless relay device located near the wireless device is included in data transferred from the wireless relay device, the setting information of the wireless device transmitting the neighbor information is provided to the wireless relay device indicated by the neighbor information.

A wireless communication system of the present invention is a wireless communication system (1) capable of wireless communication over a wireless network (N1), and includes the wireless relay device (12) described above; a management device (15) that manages the first wireless network; and the control device (17) described above.

Here, in the wireless communication system of the present invention, the management device and the control device are configured as one device.

Further, the wireless communication system of the present invention further includes: a gateway (16) set as a data transfer destination of the wireless relay device. Here, at least one of the management device and the control device, and the gateway are configured as one device.

A joining method of the present invention is a joining method of causing a wireless device (11) to join a wireless network (N1), the joining method including a step (SA13, SA21, and SD23) of transmitting a request for joining the second wireless network (N21 or N22) to the wireless relay device (12) described above; and a step (SA14, SA15, SA22, SA23, and SD25) of performing a joining process of causing the wireless device transmitting the joining request to join the second wireless network, in the wireless relay device.

Further, the joining method of the present invention further includes a step (SA18) of transmitting, by a control device (17) at an upper level, setting information necessary for a joining process for the wireless device transmitting the joining request to the wireless relay device on the basis of a transmission request from the wireless relay device.

Further, the joining method of the present invention further includes a step (SD18) of providing the setting information of the wireless device transmitting the neighbor information to the wireless relay device indicated by neighbor information in a case in which the neighbor information indicating the wireless relay device located near the wireless device is included in data transferred from the wireless relay device.

According to the present invention, since the wireless relay device including the manager that manages a second wireless network different from a first wireless network that the own device joins, and the transfer controller that transfers data transmitted to the own device over the second wireless network to a preset transfer destination over the first wireless network is installed, there is an effect that it is possible to construct a large-scale wireless network.

BRIEF DESCRIPTION OF THE DRAWINGS

The above features and advantages of the present invention will be more apparent from the following description of certain preferred embodiments taken in conjunction with the accompanying drawings.

DETAILED DESCRIPTION OF THE INVENTION

Hereinafter, a wireless relay device, a control device, a wireless communication system, and a joining method will be described in detail according to an embodiment of the present invention with reference to the drawings.

(The Wireless Communication System)

Figure 1:
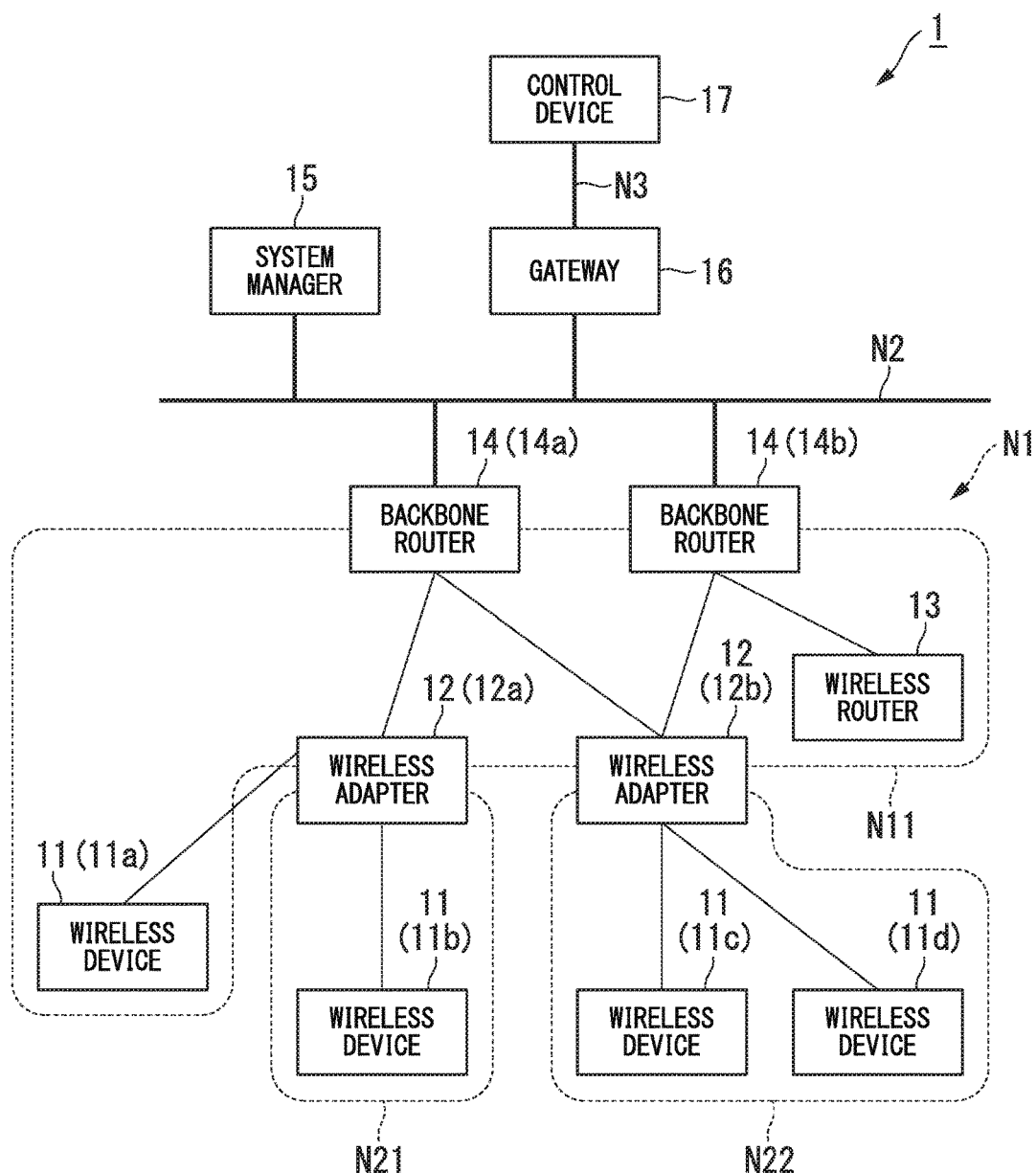
FIG. 1 is a block diagram illustrating an entire configuration of a wireless communication system according to an embodiment of the present invention.

FIG. 1 is a block diagram illustrating an entire configuration of a wireless communication system according to an embodiment of the present invention. As illustrated in FIG. 1, the wireless communication system 1 of the present embodiment includes a wireless device 11, a wireless adapter 12 (wireless relay devices), a wireless router 13, a backbone router 14, a system manager 15, a gateway 16, and a control device 17. The wireless communication system 1 having such a configuration is capable of wireless communication using a time division multiple access (TDMA) scheme over a wireless network N1.

Four wireless devices 11 are illustrated in FIG. 1, and described as wireless devices 11*a* to 11*d* to distinguish them from each other. Further, two wireless adapters 12 are illustrated in FIG. 1 and described as wireless adapters 12*a* and 12*b* to distinguish them from each other. Further, two backbone routers 14 are illustrated in FIG. 1, and described as backbone routers 14*a* and 14*b* to distinguish them from each other.

The wireless communication system 1 is constructed in, for example, a plant or a factory (hereinafter collectively referred to simply as a "plant"). Here, the above-described plant includes a plant that manages and controls a wellhead such as a gas field or an oil field or its surroundings, a plant that manages and controls power generation such as hydroelectric power generation, thermal power generation, and nuclear power generation, a plant that manages and controls environmental power generation such as solar power generation or wind power generation, or a plant that manages and controls water and sewage, a dam, and the like, in addition to an industrial plant such a chemical plant.

The wireless network N1 is a wireless network that is formed by devices (the wireless device 11, the wireless adapter 12, the wireless router 13, and the backbone routers 14) installed in a plant. This wireless network N1 includes a main wireless network N11 (a first wireless network), a sub wireless network N21 (a second wireless network), and a sub wireless network N22 (the second wireless network).

The main wireless network N11 is a wireless network that is managed by the system manager 15. The sub wireless network N21 is a wireless network managed by the wireless adapter 12*a*, and the sub wireless network N22 is a wireless network that is managed by a wireless adapter 12*b*. Although simplified and illustrated in FIG. 1, the number of the wireless device 11, the wireless adapter 12, the wireless router 13, and the backbone router 14 forming the wireless network N1 is arbitrary. Further, the number of sub wireless networks managed by the wireless adapter 12 is also arbitrary.

Further, in the plant in which the wireless communication system 1 is constructed, a backbone network N2 and a control network N3 are provided, in addition to the wireless network N1. The backbone network N2 is a wired network serving as a backbone of the wireless communication system 1, and the backbone router 14, the system manager 15, and the gateway 16 are connected to the backbone network N2. The control network N3 is a wired network located at an upper level of the backbone network N2, and the gateway 16 and the control device 17 are connected to the control network N3. The backbone network N2 and the control network N3 may be realized as wireless communication networks.

The wireless device 11 is a field device (wireless field device) that is installed in the plant and performs measurement, an operation, or the like necessary for process control under the control of the control device 17. Specifically, the wireless device 11 is, for example, a sensor device such as a flow meter or a temperature sensor, a valve device such as a flow control valve or an opening and closing valve, an actuator device such as a fan or a motor, an imaging device such as a camera or a video recorder that images a situation or an object in a plant, an audio device such as a microphone or a speaker that collects different sound or the like in the plant or generates an alarm sound, a position detection device that outputs position information of each device, or another device. This wireless device 11 performs a power-saving operation (for example, an intermittent operation) using a battery as a power source, and is capable of wireless communication using a TDMA scheme conforming to wireless communication standard ISA100.11a.

As illustrated in FIG. 1, it is assumed that the wireless device 11*a* has joined the main wireless network N11 that is managed by the system manager 15. Further, it is assumed that the wireless device 11*b* has joined the sub wireless network N21 that is managed by the wireless adapter 12*a*, and the wireless devices 11*c* and 11*d* have joined the sub wireless network N22 that is managed by the wireless adapter 12*b*.

Figure 2:
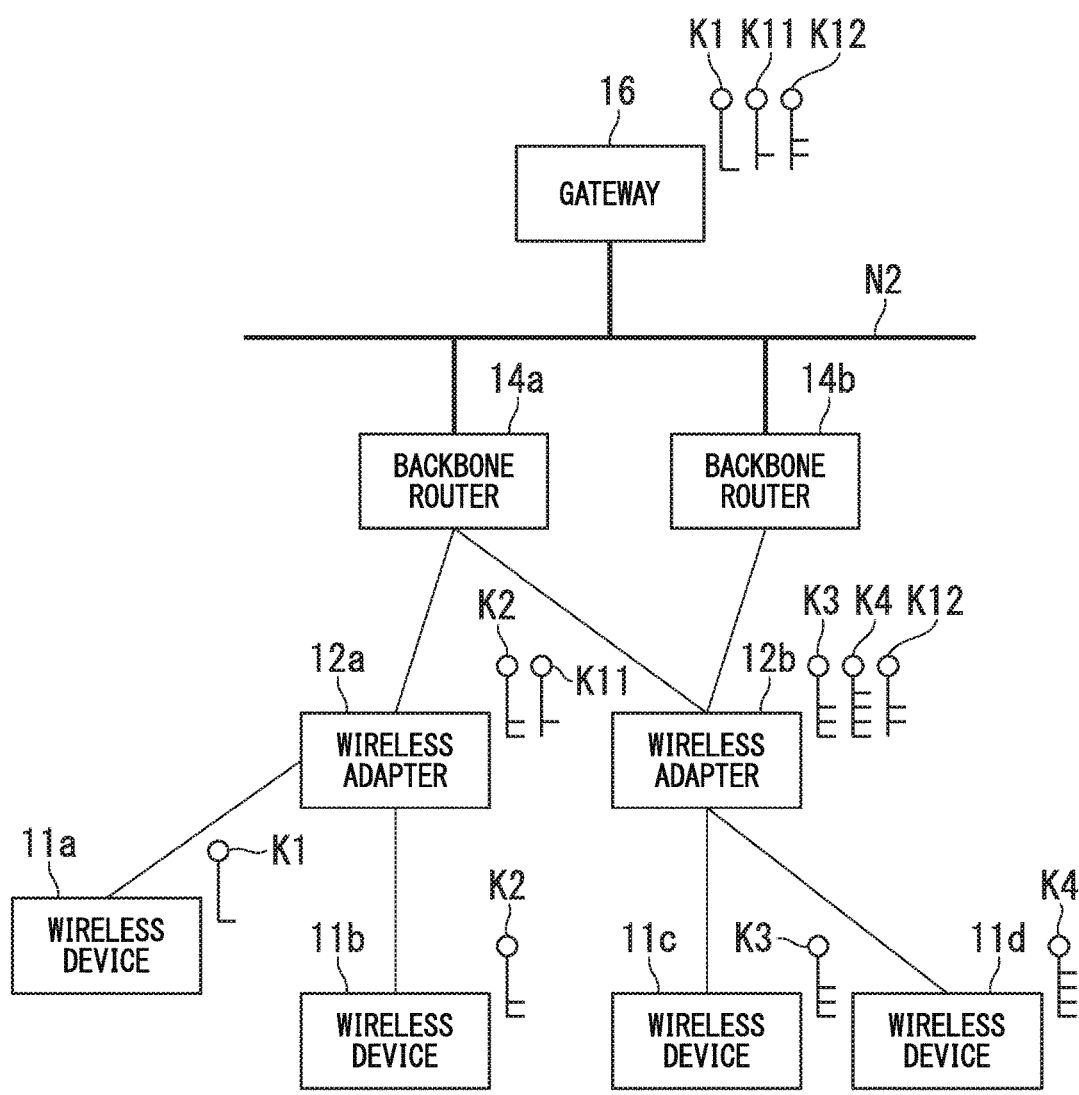
FIG. 2 is a diagram illustrating encryption keys that are distributed in a wireless communication system in an embodiment of the present invention.

Further, different encryption keys K1 to K4 (not illustrated in FIG. 1; see FIG. 2) are distributed to the wireless devices 11*a* to 11*d* in order to ensure security. FIG. 2 is a diagram illustrating the encryption keys that are distributed in a wireless communication system in an embodiment of the present invention. In FIG. 2, the wireless network N1, the main wireless network N11, the sub wireless networks N21 and N22, the system manager 15, and the control device 17 are not illustrated. As illustrated in FIG. 2, the encryption key K1 is distributed to the wireless device 11a, the encryption key K2 is distributed to the wireless device 11b, the encryption key K3 is distributed to the wireless device 11c, and the encryption key K4 is distributed to the wireless device 11d.

The encryption key K1 is an encryption key used for encryption communication between the wireless device 11a and the gateway 16. The encryption key K2 is an encryption key used for encryption communication between the wireless device 11b and the wireless adapter 12a. The encryption key K3 is an encryption key used for encryption communication between the wireless device 11c and the wireless adapter 12b, and the encryption key K4 is an encryption key used for encryption communication between the wireless device 11d and the wireless adapter 12b.

The encryption key K1 is distributed by the system manager 15 when the wireless device 11a joins the main wireless network N11. The encryption key K2 is distributed by the wireless adapter 12a when the wireless device 11b joins the main wireless network N21. The encryption keys K3 and K4 are distributed by the wireless adapter 12b when the wireless devices 11c and 11d join the sub wireless network N22.

Further, in the wireless devices 11a to 11d, a data transmission and reception setting has been performed. For example, in the wireless device 11a, the gateway 16 is set as a transmission destination of data, and a transmission timing (a transmission interval) of data to the gateway 16 is set. In the wireless device 11b, the wireless adapter 12a is set as a transmission destination of data, and a transmission timing (a transmission interval) of data to the wireless adapter 12a is set.

In the wireless devices 11c and 11d, the wireless adapter 12b is set as a transmission destination of data, and a transmission timing (a transmission interval) of data to the wireless adapter 12b is set. A reception timing (reception interval) of data is set according to a type of wireless device.

A data transmission and reception setting for the wireless device 11a is performed by the gateway 16 after the wireless device 11a joins the main wireless network N11. A data transmission and reception setting for the wireless device 11b is performed by the wireless adapter 12a after the wireless device 11b joins the sub wireless network N21. A data transmission and reception setting for the wireless devices 11c and 11d is performed by the wireless adapter 12b after the wireless devices 11c and 11d join the sub wireless network N22.

The wireless adapters 12a and 12b join the main wireless network N11, perform management of the respective sub wireless networks N21 and N22, and perform relay of data (encrypted data) over the wireless network N1. The wireless adapter 12 performs a power-saving operation (for example, an intermittent operation) using a battery as a power source, similar to the wireless device 11, and wireless communication conforming to wireless communication standard ISA100.11a is impossible. Here, the wireless adapters 12a and 12b perform management of the sub wireless networks N21 and N22 that are part of the wireless network N1 so as to reduce a process of the system manager 15 and realize a construction of a large-scale wireless network.

The wireless adapter 12a performs, for example, control of allocation of communication resources (time slots and communication channels) to the wireless device 11b joining the sub wireless network N21, a joining process of causing the wireless device 11b to join the sub wireless network N21, and distribution of the encryption key K2 to the wireless device 11b, as management of the sub wireless network N21. The wireless adapter 12b performs, for example, control of allocation of communication resources to the wireless devices 11c and 11d joining the sub wireless network N22, a joining process of causing the wireless devices 11c and 11d to join the sub wireless network N22, and distribution of the encryption keys K3 and K4 to the wireless devices 11c and 11d, as management of the sub wireless network N22.

Further, the wireless adapter 12a performs transmission and reception settings of the data described above with respect to the wireless device 11b joining the sub wireless network N21, and the wireless adapter 12b performs transmission and reception settings of the data described above with respect to the wireless devices 11c and 11d joining the sub wireless network N22. The wireless adapter 12a transfers, for example, data transmitted to the own device over the sub wireless network N21, to a preset transfer destination (the gateway 16) over the main wireless network N11. The wireless adapter 12a also performs relay of data directed to the gateway 16 that has been transmitted over the main wireless network N11 (for example, data transmitted from the wireless device 11a). The wireless adapter 12b transfers the data transmitted to the own device over the sub wireless network N22, to a preset transfer destination (gateway 16) over the main wireless network N11.

When the wireless adapters 12a and 12b perform the transfer process, the wireless adapters 12a and 12b decrypt the data transmitted to the own device, encrypt the decrypted data again, and transfer the encrypted data to a preset transfer destination.

Such decryption and encryption is performed so as to enable data transfer between different wireless networks (between the main wireless network N11 and the sub wireless networks N21 and N22) while ensuring security.

As illustrated in FIG. 2, an encryption key K11 is distributed to the wireless adapter 12a in addition to the above-described encryption key K2, and an encryption key K12 is distributed to the wireless adapter 12b in addition to the above-described encryption keys K3 and k4. The encryption key K11 is an encryption key that is used for encryption communication between the wireless adapter 12a and the gateway 16, and the encryption key K12 is an encryption key that is used for encryption communication between the wireless adapter 12b and the gateway 16. The encryption keys K2 to K4, K11, and K12 are basically distributed by the system manager 15 when the wireless adapters 12a and 12b join the main wireless network N11. However, the encryption keys K2 to K4 are distributed by the control device 17 when there is a request (an encryption key transmission request) from the wireless adapters 12a and 12b. The wireless adapter 12 will be described below in detail.

The backbone router 14 connects the wireless network N1 (the main wireless network N11) to the backbone network N2, and performs relay of data that is transmitted and received between the wireless network N1 and the backbone network N2. The backbone router 14 also performs wireless communication conforming to the wireless communication standard ISA100.11a described above.

The system manager 15 performs control of wireless communication that is performed over the main wireless network N11. Specifically, the system manager 15 performs control to allocate communication resources (time slots and communication channels) to the wireless adapter 12, the wireless router 13, the backbone routers 14, and the gateway 16 to realize wireless communication using TDMA over the main wireless network N11. Further, the system manager 15 performs a joining process of causing the wireless adapter 12, the wireless router 13, and the backbone router 14 to join the main wireless network N11. The system manager 15 performs distribution of the encryption keys K1 to K3, K11, and K12 described above when causing the wireless adapter 12, the wireless router 13, and the backbone router 14 to join the main wireless network N11.

The gateway 16 connects the backbone network N2 to the control network N3, and performs relay of various items of data that are transmitted and received between the wireless device 11, the system manager 15, or the like and the control device 17. By providing the gateway 16, it is possible to connect the backbone network N2 and the control network N3 to each other while maintaining security. The gateway 16 performs the above-described data transmission and reception setting in the wireless device 11a that has joined the main wireless network N11.

As illustrated in FIG. 2, the above-described encryption keys K1, K11, and K12 are distributed to the gateway 16. The gateway 16 performs decryption of data received from the wireless device 11a using the encryption key K1 and outputs the decrypted data to the control device 17. Further, the gateway 16 performs decryption of data received from the wireless adapter 12a using the encryption key K11 and outputs the decrypted data to the control device 17, and performs decryption of data received from the wireless adapter 12b using the encryption key K12 and outputs the decrypted data to the control device 17.

The control device 17 is a control device which is located at an upper level of the wireless adapter 12, and collectively controls the wireless device 11 and the wireless adapter 12 present in the wireless network N1. For example, the control device 17 performs distribution (provision) of the setting information set in the wireless device 11b which has joined the sub wireless network N21 to the wireless adapter 12a that manages the sub wireless network N21. Further, the control device 17 performs distribution (provision) of the setting information set in the wireless devices 11c and 11d which have joined the sub wireless network N22 to the wireless adapter 12b that manages the sub wireless network N22. The control device 17 also performs a deletion request for the setting information distributed to the wireless adapters 12a and 12b, as necessary. The control device 17 will be described below in detail.

(Wireless Relay Device)

Figure 3:
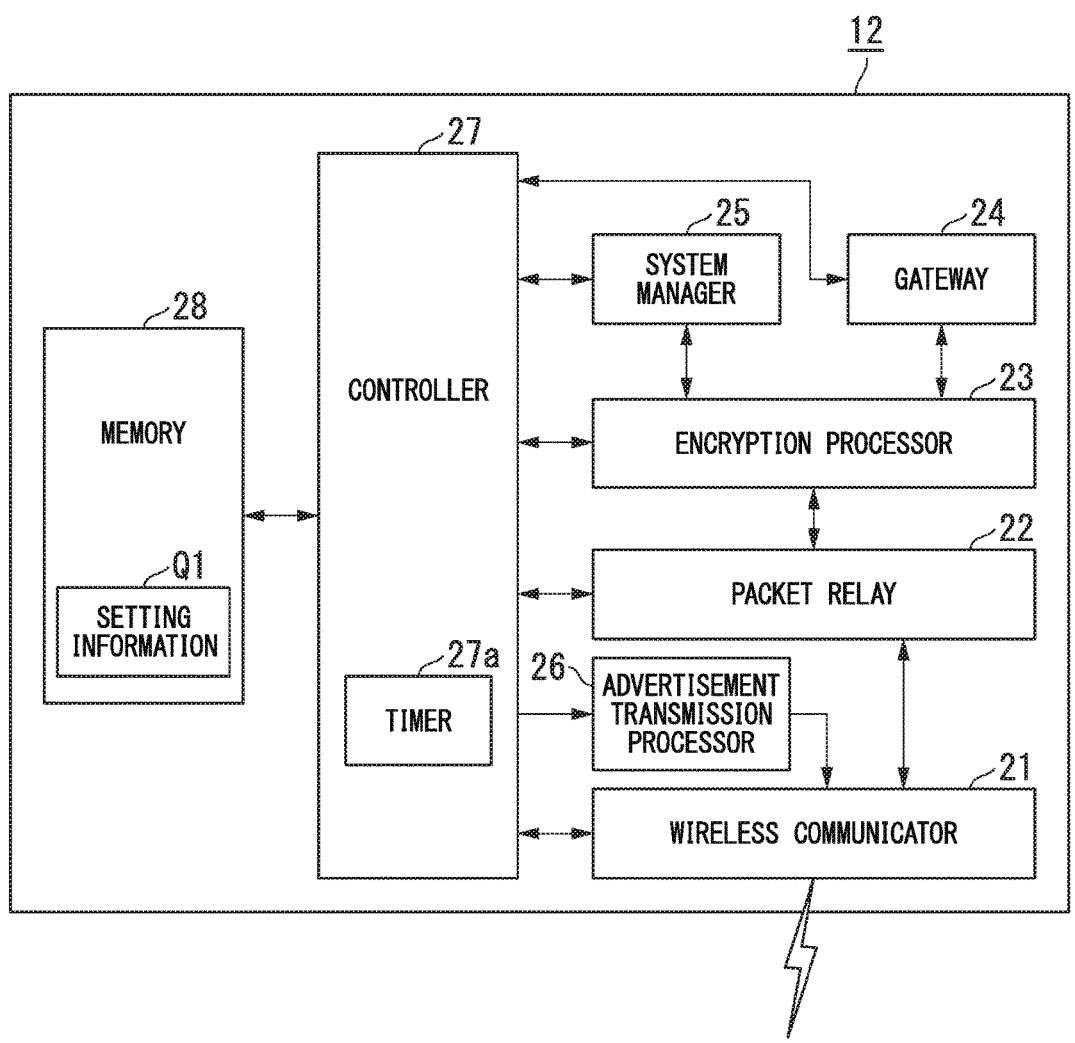
FIG. 3 is a block diagram illustrating a main configuration of a wireless adapter as a wireless relay device according to an embodiment of the present invention.

FIG. 3 is a block diagram illustrating a main configuration of the wireless adapter as a wireless relay device according to an embodiment of the present invention. As illustrated in FIG. 3, the wireless adapter 12 includes a wireless communicator 21, a packet relay 22, an encryption processor 23, a gateway 24 (a transfer controller), a system manager 25 (a manager), an advertisement transmission processor 26, a controller 27, and a memory 28 (a storage), performs management of the sub wireless network, and performs relay of data over the wireless network N1.

The wireless communicator 21 performs transmission and reception of a radio signal under the control of the controller 27. Specifically, the wireless communicator 21 receives data (packet) transmitted as a radio signal over the wireless network N1, and transmits data (packet) to be transmitted over the wireless network N1 as a radio signal.

The packet relay 22 performs a process of relaying a packet that is transmitted and received by the wireless communicator 21 under the control of the controller 27. Specifically, the packet relay 22 outputs the packet received by the wireless communicator 21 to the encryption processor 23 in a case in which the packet received by the wireless communicator 21 is directed to the own device, and to the wireless communicator 21 in a case in which the packet received by the wireless communicator 21 is not directed to the own device. Further, the packet relay 22 outputs the data output from the encryption processor 23 to the wireless communicator 21. For example, the packet relay 22 of the wireless adapter 12a outputs the data directed to the own device received from the wireless device 11b over the sub wireless network N21, to the encryption processor 23, and outputs the data directed to the gateway 16 received from the wireless device 11a over the sub wireless network N11, to the wireless communicator 21. Further, the packet relay 22 of the wireless adapter 12a outputs data to be transmitted to the gateway 16 that is output from the encryption processor 23, to the wireless communicator 21.

The encryption processor 23 performs an encryption process using an encryption key (the encryption keys K2 and K11 or the encryption keys K3, K4, and K12 illustrated in FIG. 2) under the control of the controller 27. Specifically, the encryption processor 23 decrypts the data output from the packet relay 22 and outputs the decrypted data to the gateway 24, and encrypts data output from the gateway 24 and outputs the encrypted data to the packet relay 22. For example, the encryption processor 23 of the wireless adapter 12a decrypts data directed to the own device that is received from the wireless device 11b over the sub wireless network N21 using the encryption key K2, and outputs the decrypted data to the gateway 24. Further, the encryption processor 23 of the wireless adapter 12a encrypts data to be transmitted to the gateway 16 that is output from the gateway 24 using the encryption key K11 and outputs the encrypted data to the packet relay 22.

The gateway 24 performs a transfer process of transferring the data transmitted to the own device over the sub wireless network, to a preset transfer destination (the gateway 16) over the main wireless network N11. Further, the gateway 24 performs a data transmission and reception setting for the wireless device 11 (the wireless device 11b, or the wireless devices 11c and 11d illustrated in FIG. 1) joining the sub wireless network on the basis of setting information Q1 stored in the memory 28.

The system manager 25 performs the management of the sub wireless network (the sub wireless network N21 or the sub wireless network N22 illustrated in FIG. 1) using the setting information Q1 stored in the memory 28 under the control of the controller 27. For example, the system manager 25 of the wireless adapter 12b performs control of allocation of communication resources (time slots and communication channels) to the wireless devices 11c and 11d to realize wireless communication using TDMA that is performed over the sub wireless network N22. Further, in a case in which a request for joining the sub wireless network N22 is received, the system manager 25 of the wireless adapter 12b performs a joining process for causing the wireless devices 11c and 11d to join the sub wireless network N22 using the setting information Q1. The system manager 25 of the wireless adapter 12b performs distribution of the above-described encryption keys K3 and K4 when causing the wireless devices 11c and 11d to join the sub wireless network N22.

Here, in a case in which the setting information Q1 necessary for the above joining process is not stored in the memory 28, the system manager 25 requests the control device 17 to transmit the setting information Q1 necessary for the above joining process. Further, in a case in which the system manager 25 fails in authentication of the wireless device performing the joining request in the above-described joining process, the system manager 25 requests the control device 17 to transmit new setting information for the wireless device.

Further, the system manager 25 deletes, from the memory 28, the setting information of the wireless device in which no data is obtained in a predefined period among the wireless devices that have joined the sub wireless network. Alternatively, the system manager 25 performs deletion of the setting information stored in the memory 28 on the basis of a deletion request for the setting information received from the control device 17. Such a deletion process is performed so as to maintain security by strictly performing management of the wireless device that has joined the sub wireless network, and to effectively utilize a free area of the memory 28. The deletion process will be described below in detail.

The advertisement transmission processor 26 performs a transmission process for the advertisement (information necessary in order to cause the wireless device 11 to join the sub wireless network) under the control of the controller 27. Specifically, the advertisement transmission processor 26 of the wireless adapter 12a transmits an advertisement for causing the wireless device 11 to join the sub wireless network N21, and the advertisement transmission processor 26 of the wireless adapter 12b transmits an advertisement for causing the wireless device 11 to join the sub wireless network N22. The advertisement is periodically transmitted from the wireless adapter 12 through a process of the advertisement transmission processor 26.

The controller 27 collectively controls an operation of the wireless adapter 12. For example, the controller 27 controls the wireless communicator 21, the packet relay 22, the encryption processor 23, and the gateway 24 to perform the transfer process of the data that has been transmitted to the own device. Further, the controller 27 controls the system manager 25 to perform the management of the sub wireless network, and controls the advertisement transmission processor 26 to transmit the advertisement. The controller 27 also performs control to accumulate the data output from the encryption processor 23 to the gateway 24 in the memory 28. The controller 27 includes a timer 27a and measures a time using the timer 27a.

The memory 28 is, for example, a nonvolatile semiconductor memory, and stores the setting information Q1 and stores, for example, data output from the encryption processor 23 to the gateway 24 under the control of the controller 27. The setting information Q1 stored in the memory 28 is information that is set in the wireless device 11 joining the sub wireless network, and includes, for example, information shown below.

Identification information . . . Identifier that is assigned to identify each wireless device Join key . . . Authentication key that is used in a joining process of the sub wireless network Update period . . . Period in which transmission and reception of data is performed Device information . . . Information indicating characteristics of each wireless device Number of sensors . . . Information indicating the number of sensors held in the wireless device Communication link information . . . Information indicating a communication timing Discard time information . . . Information indicating a time in which setting information of a withdrawn wireless device is deleted.

(Control Device)

Figures 4, 5:
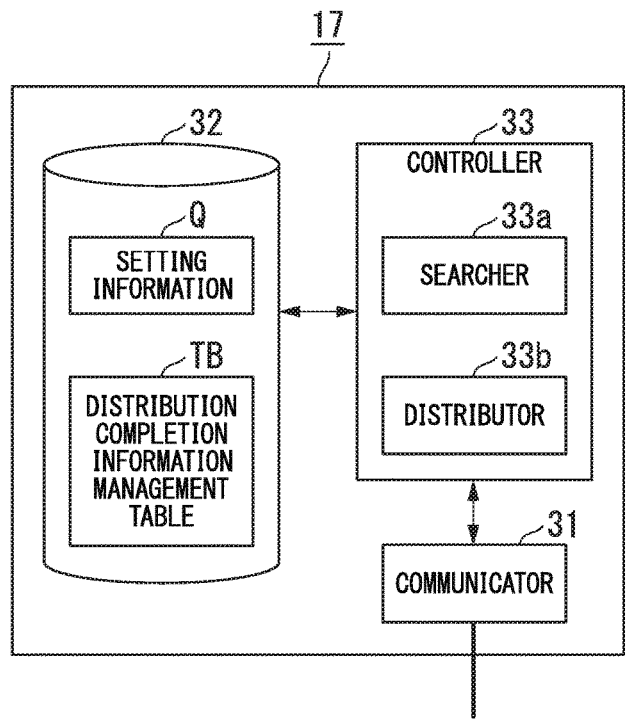
FIG. 4 is a block diagram illustrating a main configuration of a control device according to an embodiment of the present invention.
FIG. 5 is a diagram illustrating an example of setting information stored in a control device according to an embodiment of the present invention.

FIG. 4 is a block diagram illustrating a main configuration of a control device according to an embodiment of the present invention. As illustrated in FIG. 4, the control device 17 includes a communicator 31, a storage device 32, and a controller 33, and collectively controls the wireless device 11 and the wireless adapter 12 present in the wireless network N1.

The communicator 31 performs transmission and reception of various data (packets) under the control of the controller 33. Specifically, the communicator 31 receives the decrypted data output from the gateway 16, and transmits the data including setting information to be distributed to the wireless adapter 12. The storage device 32 includes, for example, a nonvolatile semiconductor memory, and stores setting information Q and a distribution completion information management table TB.

The setting information Q stored in the storage device 32 is the same information as the setting information Q1 stored in the memory 28 of the wireless adapter 12. However, both are different in that the setting information Q1 stored in the memory 28 of the wireless adapter 12 is limited to setting information set in a wireless device joining the sub wireless network managed by the wireless adapter 12, whereas the setting information Q stored in the storage device 32 is setting information for all wireless devices used in the wireless communication system 1.

FIG. 5 is a diagram illustrating an example of the setting information stored in the control device according to an embodiment of the present invention. The setting information Q illustrated in FIG. 5 is information in which the above-described "identification information", "join key", "update period", "device information", and "the number of sensors" are stored for each wireless device. In order to facilitate understanding, the setting information stored in entries E1 to E4 illustrated in FIG. 5 are assumed to be the setting information of the wireless devices 11a to 11d, respectively. For example, in the setting information of the wireless device 11a stored in the entry E1, "AA" is stored as the "identification information", "KEY-A" is stored as the "join key", "1 second" is stored as the "update period", "temperature sensor" is stored as the "device information", and "1" is stored as the "number of sensors".

Figure 6:
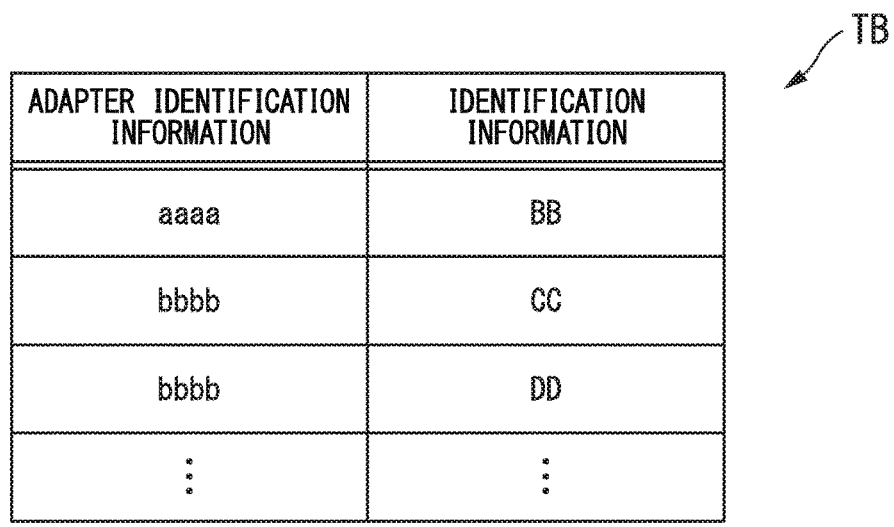
FIG. 6 is a diagram illustrating an example of a distribution completion information management table stored in a control device according to an embodiment of the present invention.

The distribution completion information management table TB is a table for managing the setting information that has already been distributed to the wireless adapter 12 in the setting information Q stored in the storage device 32. FIG. 6 is a diagram illustrating an example of the distribution completion information management table stored in the control device according to an embodiment of the present invention.

As illustrated in FIG. 5, the distribution completion information management table TB is a table in which identification information of the wireless device 11 to which the setting information has been distributed is associated with the identification information (adapter identification information) of the wireless adapter 12.

For example, in a case in which the setting information of the wireless device 11b illustrated in FIG. 1 is distributed to the wireless adapter 12a, identification information "BB" of the wireless device 11b is associated with adapter identification information "aaaa" of the wireless adapter 12a, as illustrated in FIG. 6. Further, in a case in which setting information of the wireless devices 11c and 11d illustrated in FIG. 1 is distributed to the wireless adapter 12b, identification information "CC" of the wireless device 11c and identification information "DD" of the wireless device 11d are associated with the adapter identification information "bbbb" of the wireless adapter 12b, as illustrated in FIG. 6.

The controller 33 collectively controls the operation of the control device 17. This controller 33 includes a searcher 33a and a distributor 33b, and distributes the setting information in response to a transmission request from the wireless adapter 12. In a case in which the transmission request for the setting information is received from the wireless adapter 12, the searcher 33a searches for the setting information Q stored in the storage device 32 on the basis of the transmission request. The distributor 33b distributes the setting information searched for by the searcher 33a to the wireless adapter 12 which has transmitted the transmission request for the setting information. The distribution of the setting information is performed in units of the above-described entries (for example, the entries E1 to E4). Further, the controller 33 requests the wireless adapter 12 to delete the setting information by referring to the distribution completion information management table TB. An operation performed by the control device 17 will be described below in detail.

(Joining Method)

Figure 7:
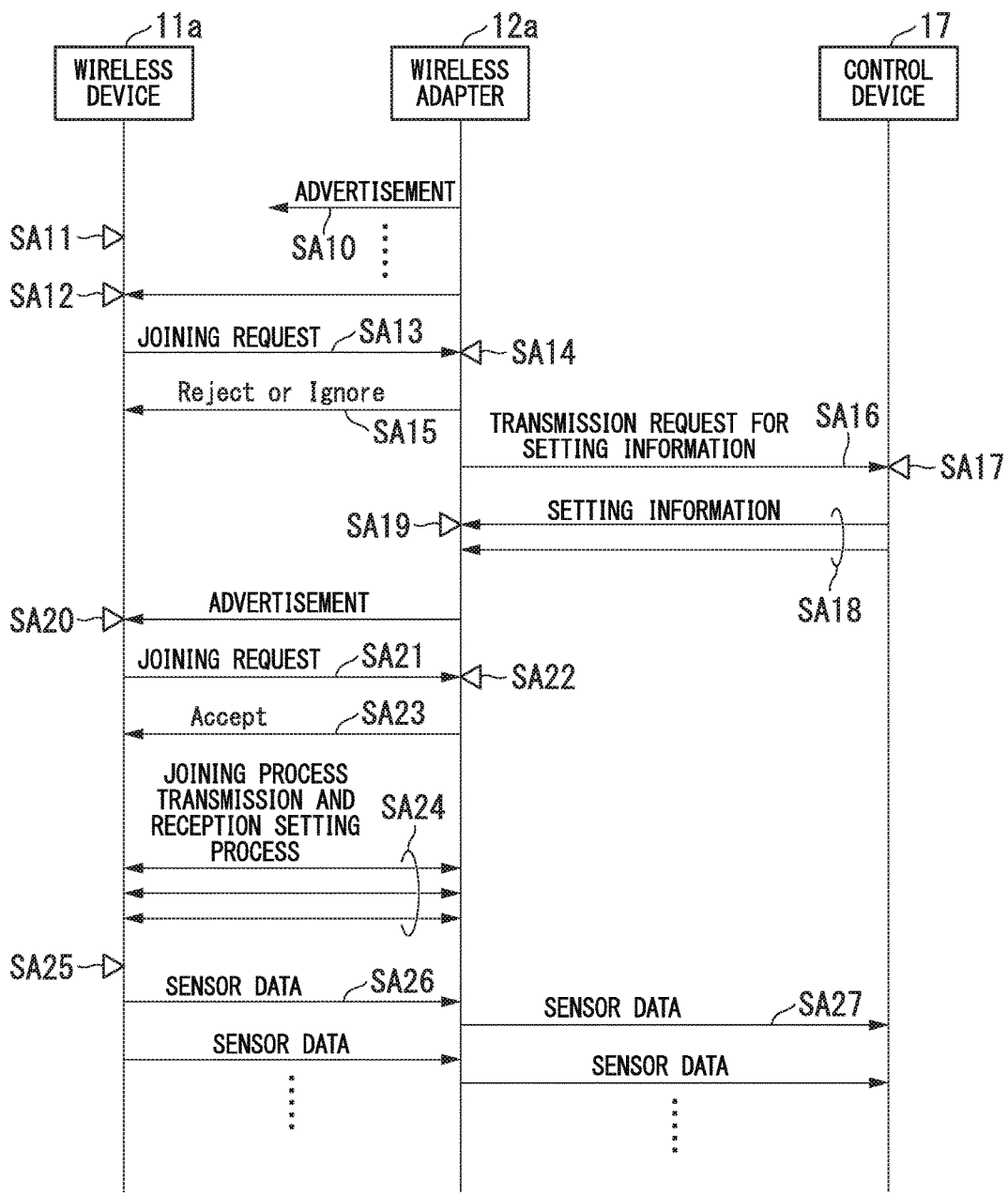
FIG. 7 is a timing chart illustrating an example of a joining method according to an embodiment of the present invention.

FIG. 7 is a timing chart illustrating an example of a joining method according to an embodiment of the present invention.

Here, an operation in a case in which the wireless device 11a illustrated in FIG. 1 is assumed to be withdrawn from the main wireless network N11 managed by the system manager 15, and the wireless device 11a joins the sub wireless network N21 managed by the wireless adapter 12a will be described by way of example. Further, it is assumed that only the wireless device 11b has joined the sub wireless network N21, and only setting information of the wireless device 11b (setting information stored in the entry E2 illustrated in FIG. 5) is stored as the setting information Q1 in the memory 28 of the wireless adapter 12a, as illustrated in FIG. 1.

As illustrated in FIG. 7, a packet of the advertisement is transmitted periodically at a certain period from the wireless adapter 12a (step SA10). If the wireless device 11a is powered on by a worker working in the plant, the wireless device 11a enters an advertisement reception standby state (discovery state) (step SA11). If the advertisement from the wireless adapter 12a is received by the wireless device 11a (step SA12), a request for joining the sub wireless network N21 (join request) is transmitted from the wireless device 11a to the wireless adapter 12a (step SA13). This joining request includes identification information "AA" of the wireless device 11a (see FIG. 5).

If the joining request from the wireless device 11a is received, the system manager 25 (see FIG. 3) of the wireless adapter 12a searches for the setting information Q1 stored in the memory 28 using identification information "AA" of the wireless device 11a included in the joining request from the wireless device 11a as a key (step SA14). As described above, only the setting information of the wireless device 11b is included in the setting information Q1 stored in the memory 28 of the wireless adapter 12a. Accordingly, the system manager 25 of the wireless adapter 12a determines that there is no setting information of the wireless device 11a, and once denies the joining request of the wireless device 11a (step SA15).

Subsequently, the system manager 25 of the wireless adapter 12a transmits a transmission request for the setting information of the wireless device 11a to the control device 17 (step SA16). The identification information "AA" of the wireless device 11a is included in this transmission request. If the transmission request from the wireless adapter 12a is received, the searcher 33a (see FIG. 4) of the control device 17 searches for the setting information Q stored in the storage device 32 using the identification information "AA" of the wireless device 11a included in the transmission request from the wireless adapter 12a as a key, and obtains the setting information including the identification information "AA" (the setting information stored in the entry E1 illustrated in FIG. 5) (step SA17). The setting information obtained by the searcher 33a of the control device 17 is output to the distributor 33b, and distributed to the wireless adapter 12a by the distributor 33b (step SA18).

If the setting information distributed by the distributor 33b of the control device 17 is received, the system manager 25 of the wireless adapter 12a stores the received setting information in the memory 28 as the setting information Q1 (step SA19). Accordingly, the setting information Q1 stored in the memory 28 includes the setting information of the wireless device 11a, in addition to the setting information of the wireless device 11b. Thus, distribution of setting information of the wireless device 11a of which joining the sub wireless network N21 has been once rejected from the control device 17 to the wireless adapter 12a is performed.

On the other hand, if joining the sub wireless network N21 is rejected, the wireless device 11a enters the advertisement reception standby state again. If the advertisement from the wireless adapter 12a is received by the wireless device 11a (step SA20), the request for joining the sub wireless network N21 is transmitted from the wireless device 11a to the wireless adapter 12a again (step SA21).

If the joining request is received from the wireless device 11a, the system manager 25 of the wireless adapter 12a performs searching again to determine whether or not the setting information of the wireless device 11a is included in the setting information Q1 stored in the memory 28 (step SA22).

Through the above-described process (the process in steps SA18 and SA19), the setting information of the wireless device 11a is distributed from the control device 17 to the wireless adapter 12a. Accordingly, the system manager 25 of the wireless adapter 12a determines that there is the setting information of the wireless device 11a and accepts the joining request of the wireless device 11a (step SA23). An authentication process for the wireless device 11a using the setting information is performed by the system manager 25 of the wireless adapter 12a, and after the authentication process ends, a transmission and reception setting for the wireless device 11a using the setting information is performed by the gateway 24 of the wireless adapter 12a (step SA24). For example, the update period of the wireless device 11a is set to "1 second".

If this process is completed, the wireless device 11a enters a state in which the wireless device 11a has joined the sub wireless network N21 (step SA25). Then, sensor data (data indicating a flow rate, temperature, pressure, or the like measured by the wireless device 11a) directed to the wireless adapter 12a is transmitted from the wireless device 11a (step SA26). This sensor data is received by the wireless communicator 21 of the wireless adapter 12a, once decrypted by the encryption processor 23, subjected to a transfer process by the gateway 24, encrypted by the encryption processor 23 again, and then transferred to the gateway 16. Data transferred from the wireless adapter 12a is received and decrypted by the gateway 16, and output to the control device 17 (step SA27). Thereafter, the sensor data is sequentially transmitted from the wireless device 11a to the control device 17 in the update period set in the wireless device 11a.

In the example illustrated in FIG. 7, in a case in which it is determined that there is no setting information of the wireless device 11a, the wireless adapter 12a once rejects the joining request of the wireless device 11a, and requests the control device 17 to transmit the setting information of the wireless device 11a. However, in such a case, the wireless adapter 12a may wait without rejecting the joining request of the wireless device 11a, acquire the setting information of the wireless device 11a in the meantime, and accept the joining request of the wireless device 11a.

Further, in the example illustrated in FIG. 7, in a case in which it is determined that there is no setting information of the wireless device 11a, the wireless adapter 12a may request the control device 17 to transmit the setting information of the wireless device 11a. However, in a case in which there is the setting information of the wireless device 11a, but the authentication of the wireless device 11a fails (for example, in a case in which a join key does not match), the wireless adapter 12a may also request the control device 17 to transmit new setting information of the wireless device 11a.

(Method of Managing Setting Information)

Next, a method by which the wireless adapter manages the setting information of the wireless device will be described.

Figure 8:
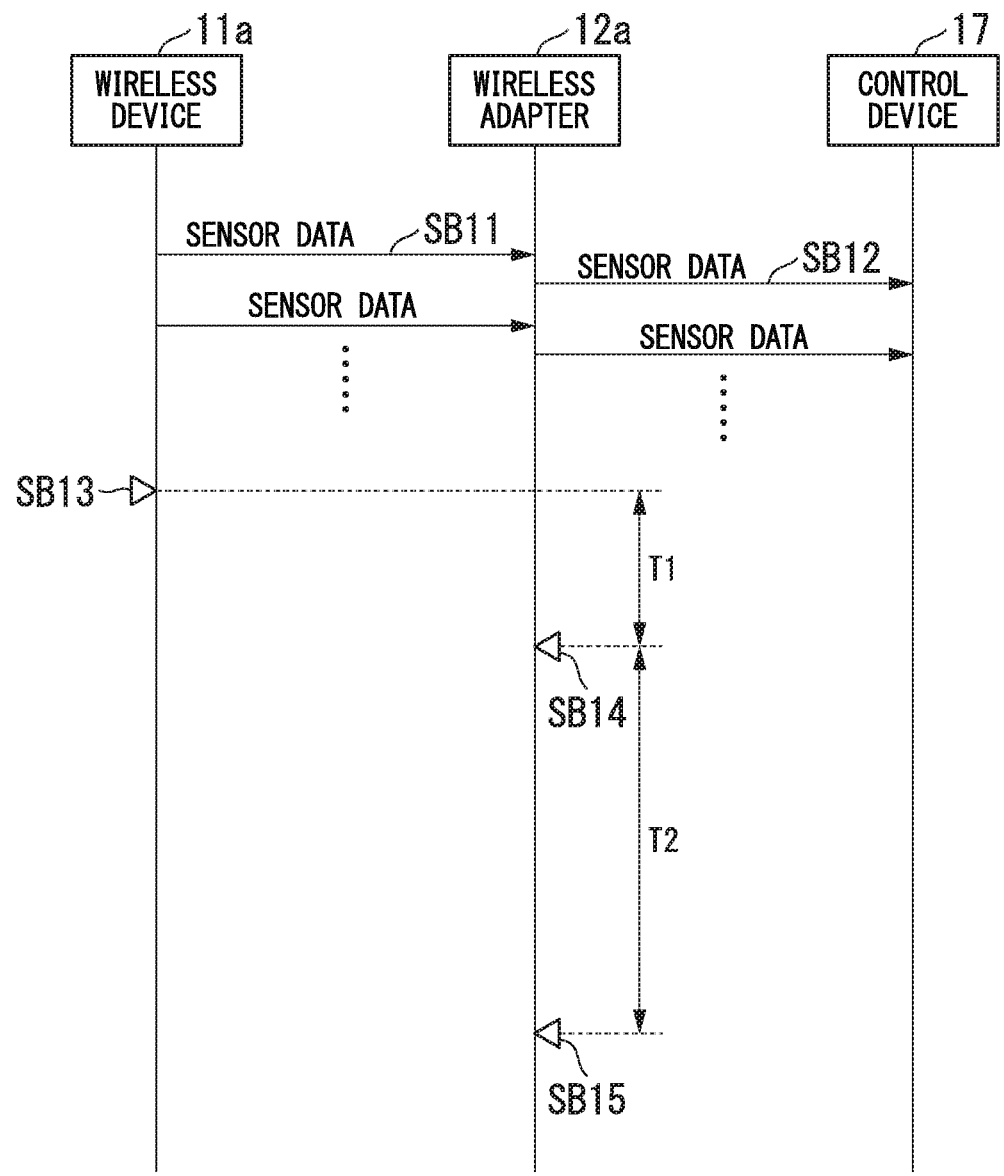
FIG. 8 is a timing chart illustrating an example of a method of managing setting information that is performed in an embodiment of the present invention.

FIG. 8 is a timing chart illustrating an example of a method of managing setting information that is performed in an embodiment of the present invention. Here, an operation in a case in which the wireless device 11a that has joined the sub wireless network N21 using the above-described joining method is powered off will be described by way of example. Such a management is performed so as to maintain security by strictly performing management of the wireless device 11a which has joined the sub wireless network N21, and to effectively utilize a free area of the memory 28 of the wireless adapter 12a. Further, it is assumed that, in an initial state, the wireless devices 11a and 11b join the sub wireless network N21, and setting information of the wireless devices 11a and 11b is stored as the setting information Q1 in the memory 28 of the wireless adapter 12a.

As illustrated in FIG. 8, sensor data directed to the wireless adapter 12a is sequentially transmitted in the update period set in the wireless device 11a from the wireless device 11a (step SB 11). This sensor data is sequentially transmitted to the control device 17 via the wireless adapter 12a (step SB12). Here, it is assumed that the wireless device 11a is powered off by a worker working in the plant (step SB13). Then, the transmission of sensor data from the wireless device 11a stops.

If the sensor data from the wireless device 11a cannot be received, the controller 27 of the wireless adapter 12a operates the timer 27a to determine the disconnection of wireless communication with the wireless device 11a. In a case in which the sensor data from the wireless device 11a is not obtained even when a predefined period T1 (for example, approximately 5 minutes: first period) elapses after the timer 27a is operated, the controller 27 of the wireless adapter 12a determines that the communication with the wireless device 11a has been disconnected (step SB 14). At this point in time, since the joining request from the wireless device 11a is likely to be received, the system manager 25 of the wireless adapter 12a does not perform deletion of the setting information of the wireless device 11a.

In a case in which the controller 27 of the wireless adapter 12a determines that the communication with the wireless device 11a has been disconnected, the controller 27 of the wireless adapter 12a operates the timer 27a again. In a case in which the joining request is not received from the wireless device 11a even when a period T2 (for example, about 30 minutes to about 1 hour: second period) defined in consideration of a re-joining request from the wireless device 11a elapses after the timer 27a is operated again, the system manager 25 of the wireless adapter 12a deletes the setting information of the wireless device 11a from the setting information Q1 stored in the memory 28 (step SB 15). Thus, the setting information of the wireless device 11a withdrawn from the sub wireless network N21 managed by the wireless adapter 12a is deleted from the wireless adapter 12a.

In the example illustrated in FIG. 8, the wireless adapter 12a has deleted the setting information of the wireless device 11a after the periods T1 and T2 elapse after the data from the wireless device 11a is not obtained. However, in a case in which the wireless adapter 12a receives the joining request of the wireless device and when there is no free space in the memory 28, the wireless adapter 12a may delete the setting information of the wireless devices that have not joined the sub wireless network N21.

(Method of Deleting Setting Information)

Figure 9:
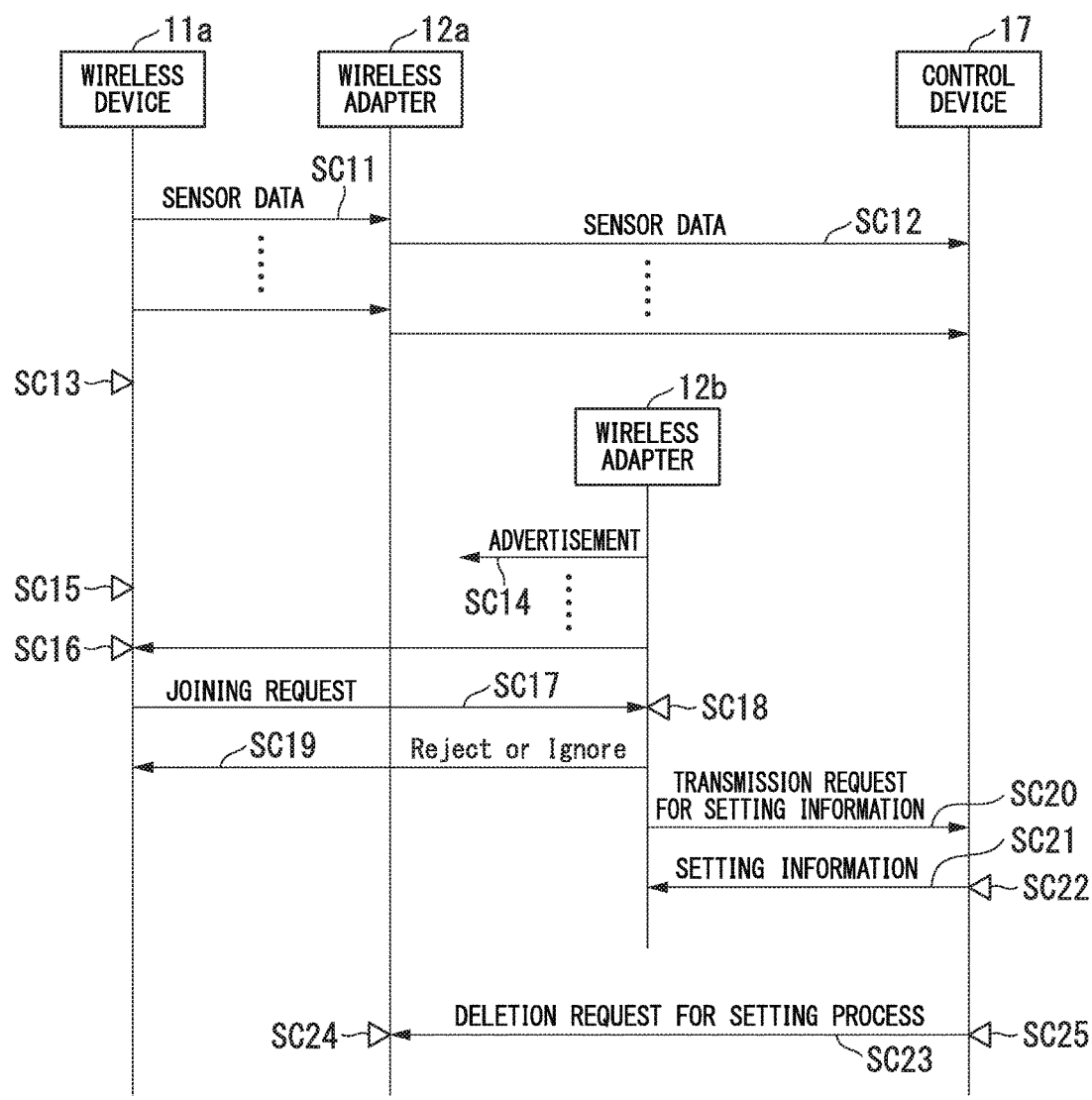
FIG. 9 is a timing chart illustrating an example of a method of deleting setting information that is performed in an embodiment of the present invention.

Next, a deletion method by which the control device 17 causes the wireless adapter to delete the setting information of the wireless device will be described. FIG. 9 is a timing chart illustrating an example of a method of deleting the setting information that is performed in an embodiment of the present invention. Here, an operation in a case in which the wireless device 11a which has joined the sub wireless network N21 is withdrawn from the sub wireless network N21 and joins the sub wireless network N22 managed by the wireless adapter 12b in the above-described joining method will be described by way of example. The control device 17 causes the wireless adapter to delete the setting information of the wireless device for the same reason as that in the above-described management method.

In order to simplify the description, it is assumed that in an initial state, the wireless devices 11a and 11b have joined the sub wireless network N21 and no wireless device has joined the sub wireless network N22. Therefore, it is assumed that setting information of the wireless devices 11a and 11b is stored as the setting information Q1 in the memory 28 of the wireless adapter 12a, and setting information Q1 is not stored in the memory 28 of the wireless adapter 12b. Further, it is assumed that a distribution completion information management table TB in which the identification information "AA" of the wireless device 11a and the identification information "BB" of the wireless device 11b are associated with the adapter identification information "aaaa" of the wireless adapter 12a is stored in the storage device 32 of the control device 17.

As illustrated in FIG. 9, sensor data directed to the wireless adapter 12a is sequentially transmitted in the update period set in the wireless device 11a from the wireless device 11a (step SC11). This sensor data is sequentially transmitted to the control device 17 via the wireless adapter 12a (step SC12). Here, it is assumed that the wireless device 11a is powered off due to any abnormality occurring in the wireless device 11a (step SC13). Then, the transmission of sensor data from the wireless device 11a stops. As illustrated in FIG. 9, a packet of the advertisement is transmitted periodically in a certain period from the wireless adapter 12b (step SC14).

In is assumed that after the above abnormality occurs, the wireless device 11a is powered on by a worker working in the plant, or the wireless device 11a is automatically returned and automatically powered on (step SC15). Then, the wireless device 11a enters an advertisement reception standby state. If the advertisement from the wireless adapter 12b is received by the wireless device 11a (Step SC16), a request for joining the sub wireless network N22 is transmitted from the wireless device 11a to the wireless adapter 12b (step SC17). This joining request includes the identification information "AA" of the wireless device 11a (see FIG. 5).

If the joining request from the wireless device 11a is received, the system manager 25 of the wireless adapter 12b searches for the setting information Q1 stored in the memory 28 using identification information "AA" of the wireless device 11a included in the joining request from the wireless device 11a as a key (step SC18). As described above, since the setting information Q1 is not stored in the memory 28 of the wireless adapter 12b, the system manager 25 of the wireless adapter 12b once rejects the joining request of the wireless device 11a (step SC19).

Subsequently, the system manager 25 of the wireless adapter 12b transmits a transmission request for the setting information of the wireless device 11a to the control device 17 (step SC20). The identification information "AA" of the wireless device 11a is included in this transmission request. If the transmission request from the wireless adapter 12b is received, the setting information Q stored in the storage device 32 is searched for by the searcher 33a of the control device 17, and the obtained setting information of the wireless device 11a (the setting information stored in the entry E1 illustrated in FIG. 5) is distributed to the wireless adapters 12b by the distributor 33b (step SC21). Here, the controller 33 of the control device 17 stores information in which the identification information "AA" of the wireless device 11a is associated with the adapter identification information "bbbb" of the wireless adapter 12b in the distribution completion information management table TB of the storage device 32 (step SC22).

Subsequently, the controller 33 of the control device 17 searches for the setting information Q stored in the storage device 32 using the identification information "AA" of the wireless device 11a of which the distribution of setting information has been performed as a key. Through this search, information (previously distributed information) in which the identification information "AA" of the wireless device 11a is associated with the identification information "aaaa" of the wireless adapter 12a, and information (newly distributed information) in which the identification information "AA" of the wireless device 11a is associated with the identification information "bbbb" of the wireless adapter 12b are obtained.

Then, the controller 33 of the control device 17 transmits a deletion request to the wireless adapter 12a to request deletion of the setting information of the wireless device 11a on the basis of the previously distributed information (step SC23). If the deletion request from the control device 17 is received, the system manager 25 of the wireless adapter 12a deletes the setting information of the wireless device 11a from the setting information Q1 stored in the memory 28 (Step SC24).

Further, the controller 33 of the control device 17 performs a process of deleting the information (previously distributed information) in which the identification information "AA" of the wireless device 11a is associated with the identification information "aaaa" of the wireless adapter 12a from the distribution completion information management table TB of the storage device 32 (step SC25). Thus, in a case in which the setting information of the wireless device 11a is newly distributed to the wireless adapter 12b, the setting information distributed to the wireless adapter 12a in the past is deleted, and content of the distribution completion information management table TB stored in the storage device 32 of the control device 17 is updated.

(Joining Method for a Moving Body)

Figure 10:
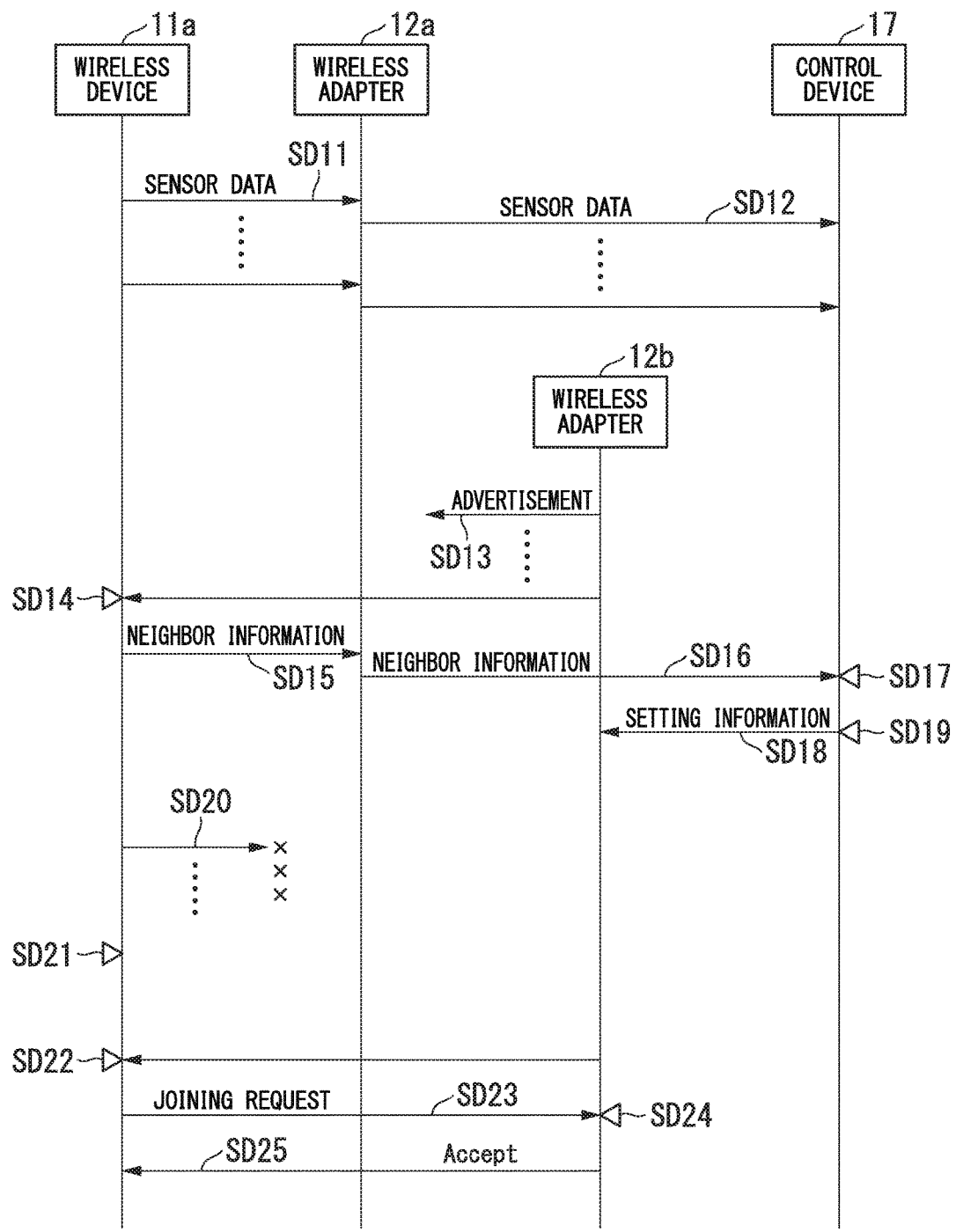
FIG. 10 is a timing chart illustrating an example of a joining method for a moving body according to an embodiment of the present invention.

Next, a method of causing a wireless device as a moving body to join the sub wireless network will be described. FIG. 10 is a timing chart illustrating an example of a joining method for a moving body according to an embodiment of the present invention. Here, an operation in a case in which the wireless device 11a as a moving body which has joined the sub wireless network N21 is withdrawn from the sub wireless network N21 due to movement and joins the sub wireless network N22 managed by the wireless adapter 12b will be described by way of example. The wireless device 11a as a moving body is, for example, a mobile noise meter.

In order to simplify the description, it is assumed that in an initial state, the wireless devices 11a and 11b have joined the sub wireless network N21 and no wireless device has joined the sub wireless network N22, similar to the "method of deleting the setting information" described above. Therefore, it is assumed that setting information of the wireless devices 11a and 11b is stored as the setting information Q1 in the memory 28 of the wireless adapter 12a, and setting information Q1 is not stored in the memory 28 of the wireless adapter 12b. Further, it is assumed that a distribution completion information management table TB in which the identification information "AA" of the wireless device 11a and the identification information "BB" of the wireless device 11b are associated with the adapter identification information "aaaa" of the wireless adapter 12a is stored in the storage device 32 of the control device 17.

As illustrated in FIG. 10, sensor data directed to the wireless adapter 12a is sequentially transmitted in the update period set in the wireless device 11a from the wireless device 11a as a moving body (step SD11). This sensor data is sequentially transmitted to the control device 17 via the wireless adapter 12a (step SD12). The wireless device 11a performs transmission of the sensor data while moving, gradually approaches the wireless adapter 12b, and enters an area in which the wireless device 11a can receive a radio signal from the wireless adapter 12b. As illustrated in FIG. 10, a packet of the advertisement is transmitted periodically in a certain period from the wireless adapter 12b (step SD13). The adapter identification information "bbbb" of the wireless adapter 12b is included in the advertisement received from the wireless adapter 12b.

If the advertisement from the wireless adapter 12b is received by the wireless device 11a (step SD14), neighbor information including the adapter identification information "bbbb" included in the advertisement from the wireless adapter 12b is transmitted to the wireless adapter 12a (step SD15). The above-described neighbor information is information indicating a wireless adapter that is located near the wireless device, and is defined in the wireless communication standard ISA100.11a. The neighbor information here is information indicating the wireless adapter 12b that is located near the wireless device 11a. This neighbor information is transmitted to the control device 17 via the wireless adapter 12a (step SD16). The identification information "AA" of the wireless device 11a that has transmitted the neighbor information is included in the neighbor information transmitted from the wireless adapter 12a to the control device 17, in addition to the adapter identification information "bbbb" of the wireless adapter 12b.

If the neighbor information from the wireless adapter 12a is received, the controller 33 of the control device 17 determines whether or not the setting information of the wireless device 11a that has transmitted the neighbor information has been distributed to the wireless adapter 12b by referring to the distribution completion information management table TB stored in the storage device 32 (step SD17). Here, the setting information of the wireless device 11a has not yet been distributed to the wireless adapter 12b. Therefore, the controller 33 of the control device 17 causes the searcher 33a to search for the setting information of the wireless device 11a, and causes the distributor 33b to distribute the setting information of the wireless device 11a obtained by the searcher 33a (step SD18). The controller 33 of the control device 17 stores information in which the identification information "AA" of the wireless device 11a is associated with the adapter identification information "bbbb" of the wireless adapter 12b in the distribution completion information management table TB of the storage device 32 (step SD19).

If the wireless device 11a continues to move and the wireless device 11a exits an area in which the wireless device 11a can receive a radio signal from the wireless adapter 12a, a transmission error of the sensor data occurs as illustrated in FIG. 10 (step SD20). If the number of times the transmission error occurs is a predefined number of times, the wireless device 11a determines that the wireless communication with the wireless adapter 12a is disconnected, and enters the advertisement reception standby state (step SD21).

If the advertisement from the wireless adapter 12b is received by the wireless device 11a (Step SD22), a request for joining the sub wireless network N22 is transmitted from the wireless device 11a to the wireless adapter 12b (step SD23). If the joining request from the wireless device 11a is received, the system manager 25 of the wireless adapter 12b performs searching to determine whether the setting information of the wireless device 11a is included in the setting information Q1 stored in the memory 28 (step SD24).

Since the setting information of the wireless device 11a has already been distributed from the control device 17 to the wireless adapter 12b through the above-described process (the process of step SD18), the system manager 25 of the wireless adapter 12b immediately accepts the joining request of the wireless device 11a (step SD25). Thus, the setting information of the wireless device 11a is distributed from the control device 17 to the wireless adapter 12b in advance on the basis of the neighbor information transmitted from the wireless device 11a, and when the wireless device 11a joins the sub wireless network N22, the joining is accepted immediately by the wireless adapter 12b. Therefore, it is possible to cause the wireless adapter 12b as a moving body to rapidly join the sub wireless network N22.

As described above, in this embodiment, the wireless adapter 12 (12a and 12b) including the gateway 24 and the system manager 25 is installed within the wireless network N1, and the respective wireless adapters 12a and 12b manage the sub wireless networks N21 and N22 different from the main wireless network N11 that the own device joins, and transfer the data transmitted to the own device over the sub wireless networks N21 and N22, to a preset transfer destination (gateway 16) over the main wireless network N11. Therefore, a process of the system manager 15 is reduced, and it is possible to construct a large-scale wireless network.

Further, in this embodiment, the wireless adapters 12a and 12b managing the sub wireless networks N21 and N22 perform the process of joining the sub wireless networks N21 and N22, respectively. Therefore, a wireless bandwidth necessary for the joining process performed in order to cause the wireless device to join the sub wireless networks N21 and N22 may be secured inside the respective sub wireless networks N21 and N22, and since a wireless bandwidth in the main wireless network N11 is not consumed, it is also possible to construct a large-scale wireless network.

Further, since the process of joining the sub wireless networks N21 and N22 is performed by the wireless adapters 12a and 12b that manage the sub wireless networks N21 and N22, respectively, an increase in power consumption of the relay device (wireless router) arranged on a path between the wireless adapters 12a and 12b and the system manager 15 is not caused. Further, the process of joining the sub wireless networks N21 and N22 can also be performed in a short period of time. Accordingly, it is possible to construct a large-scale wireless network.

Although the wireless relay device, the control device, the wireless communication system, and the joining method according to an embodiment of the present invention have been described, the present invention is not limited to the above-described embodiments and can be freely changed within the scope of the present invention. For example, in the above-described embodiment, a communication protocol used for wireless communication over the main wireless network N11, the communication protocol used for wireless communication over the sub wireless network N21, and the communication protocol used for wireless communication over the sub wireless network N22 may be the same or may be different.

Specifically, in the above-described embodiment, both of the communication protocol used for wireless communication over the main wireless network N11 and the communication protocol used for wireless communication over the sub wireless networks N21 and N22 are communication protocols conforming to the wireless communication standard ISA100.11a. However, for example, the communication protocol used for wireless communication over the main wireless network N11 may be a communication protocol conforming to the wireless communication standard ISA100.11a, and the communication protocol used for wireless communication over the sub wireless networks N21 and N22 may be a communication protocol conforming to WirelessHART (registered trademark) or ZigBee (registered trademark).

Further, in the above-described embodiment, the example in which the backbone router 14, the system manager 15, the gateway 16, and the control device 17 are realized as respective separate devices has been described. However, any two or more of the devices can be realized as one unit.

As used herein, the following directional terms "forward, rearward, above, downward, right, left, vertical, horizontal, below, transverse, row and column" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

The term "configured" is used to describe a component, unit or part of a device includes hardware and/or software that is constructed and/or programmed to perform the desired function.

Moreover, terms that are expressed as "means-plus function" in the claims should include any structure that can be utilized to perform the function of that part of the present invention.

The term "unit" or "part" is used to describe a component, unit or part of a hardware and/or software that is constructed and/or programmed to perform the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A wireless communication system capable of wireless communication over a wireless network, the wireless communication system comprising: a wireless relay device that performs relay of data over the wireless network, the wireless relay device comprising: a manager that manages a second wireless network different from a first wireless network that the wireless relay device joins: a transfer controller that transfers data transmitted to the wireless relay device over the second wireless network, to a preset transfer destination over the first wireless network; and a storage that stores setting information that is set in a wireless device to be joined in the second wireless network;
a management device that manages the first wireless network and performs a joining process of causing a wireless device, which has transmitted a request for joining the first wireless network, to join the first wireless network;
and a control device that controls a device joining the wireless network, wherein setting information set in a wireless device joining the second wireless network is provided to the wireless relay device,
the manager determines whether or not the setting information of the wireless device, which has manager performs a joining process of causing the wireless device, which has transmitted the request for joining the second wireless network, to join the second wireless network using the setting information stored in the storage in a case in which the manager determines that the control device at an upper level to transmit the setting information of the wireless device, which has transmitted the request for joining the second wireless network, stores the setting information received from the control device into the storage, and performs the airline process of causing the wireless device to join the second wireless network using the setting information stored in the storage in a case in which the manager determines that the setting information of the wireless device is not stored in the storage,
the control device comprises a storage device storing a management table including information in which identification information of the wireless device, the setting information of which is provided to the wireless relay device, is associated with identification information of the wireless relay device, and in a case in which the management table includes first information in which identification information of a first wireless device, the setting information of which is provided to a first wireless relay device, is associated with identification information of the first wireless relay device and the control device receives a request for transmitting the setting information of the first wireless device from a second wireless relay device, the control device transmits the setting information of the first wireless device to the second wireless relay device, deletes the first information from the management table, and adds second information in which the identification information of the first wireless device is associated with the identification information of the second wireless relay device.

2. The wireless communication system according to claim 1, wherein in a case in which the manager fails in authentication of the wireless device transmitting the joining request, the manager requests the control device at an upper level to transmit new setting information.

3. The wireless communication system according to claim 1, wherein the manager deletes the setting information of the wireless device in which no data is obtained in a predefined period, from the storage.

4. The wireless communication system according to claim 3, wherein the manager deletes the setting information of the wireless device from the storage in a case in which a first period defined so as to determine disconnection of wireless communication elapses and a second period defined in consideration of re-joining the second wireless network elapses after no data from the wireless device is obtained.

5. The wireless communication system according to claim 1, wherein the manager performs deletion of the setting information stored in the storage on the basis of a deletion request for the setting information received from the control device at an upper level.

6. The wireless communication system according to claim 1, wherein the transfer controller performs data transmission and reception setting for the wireless device that joins the second wireless network on the basis of the setting information stored in the storage.

7. The wireless communication system according to claim 1, wherein the data transmitted to the wireless relay device over the second wireless network is encrypted, and the wireless relay device further comprises an encryption processor that performs decryption of the data which is transmitted to the wireless relay device and performs encryption of the data to be transferred to the transfer destination.

8. The wireless communication system according to claim 1, wherein the control device provides setting information set in a wireless device joining the second wireless network to the wireless relay device.

9. The wireless communication system according to claim 8, wherein the control device performs a deletion request for the setting information is to the wireless relay device.

10. The wireless communication system according to claim 8, wherein in a case in which neighbor information indicating the wireless relay device located near the wireless device is included in data transferred from the wireless relay device, the control device provides the setting information of the wireless device transmitting the neighbor information to the wireless relay device indicated by the neighbor information.

11. The wireless communication system according to claim 1, wherein the management device and the control device are configured as one device.

12. The wireless communication system according to claim 1, further comprising: a gateway set as a data transfer destination of the wireless relay device.

13. The wireless communication system according to claim 12, wherein at least one of the management device and the control device, and the gateway are configured as one device.

* * * * *